United States Patent
Fry

(12) 
(10) Patent No.: US 6,182,716 B1
(45) Date of Patent: Feb. 6, 2001

(54) CATALYST UNLOADING DEVICE

(75) Inventor: Paul Fry, League City, TX (US)

(73) Assignee: Philip ST, Inc., Houston, TX (US)

( * ) Notice: Under 35 U.S.C. 154(b), the term of this patent shall be extended for 0 days.

(21) Appl. No.: 09/349,829

(22) Filed: Jul. 8, 1999

(51) Int. Cl.[7] .............................. B65B 1/08; B65B 1/16; B65B 3/08; B65B 3/10; B67C 3/02

(52) U.S. Cl. ................... 141/67; 141/65; 141/91; 134/166 C; 134/169 C; 242/390; 242/390.1; 15/315; 15/345

(58) Field of Search .................. 141/65, 67, 91, 141/92; 134/166 C, 169 R, 169 C; 242/389, 390, 390.1, 390.2, 390.8, 390.9; 15/315, 345

(56) References Cited

U.S. PATENT DOCUMENTS

| | | | |
|---|---|---|---|
| 5,007,599 | * 4/1991 | Forsyth | 242/86.51 |
| 5,222,533 | 6/1993 | Porter, Jr. | 141/65 |
| 5,228,484 | 7/1993 | Johnson | 141/65 |
| 5,495,995 | * 3/1996 | Dominque et al. | 242/390.1 |

* cited by examiner

Primary Examiner—Timothy L. Maust
(74) Attorney, Agent, or Firm—Jenkens & Gilchrist, P.C.

(57) ABSTRACT

An electric motor is operatively connected to a reel for selectively storing, paying out, and rewinding an air lance of a device for unloading catalyst from tubular reactors. The electric motor powered reel provides improved on/off control of the air lance mounted on the reel, a braking force during withdrawal of the air lance from the reel, constant speed operation during rotation of the reel, and avoids the problem of lubricant contamination of the catalyst and reactor tubes.

2 Claims, 2 Drawing Sheets

CATALYST UNLOADING DEVICE

BACKGROUND OF THE INVENTION

1. Technical Field

This invention relates generally to a device for unloading catalyst from a tubular reactor, and more particularly to such a device that has an air lance that is mounted on a motor-driven reel.

2. Background Art

Difficulties have been encountered in removing catalyst, such as granular or particulate catalyst, from the tubes of multi-tube reactors. The catalyst is prone to becoming lodged within the tubes during reactor operation. Often, the particulate catalyst may completely block or bridge some or all of the tubes of the reactor due to heat or composition changes during operation, resulting in retarded or blocked movement or flow of the catalyst.

U.S. Pat. No. 5,228,484, issued Jul. 20, 1993 to Kelly J. Johnson, and entitled Air Lance Reel for Catalyst Unloading of Tubular Reactors, describes a device having an air lance that is insertable into catalyst tubes and supplies air for breaking up the catalyst prior to removal. The Johnson device uses an air-motor powered reel to dispense and retrieve the lance from the catalyst tubes of the reactor.

In actual operation, air-motor powered air lance reels have presented several problems. Because the air-powered reel uses a compressible fluid, the reel is subject to retarded start and stop operation and therefore lacks a positive on/off control. Also, as a result of compressed air fluctuations, constant speed control of the reel is difficult to maintain. In addition, when paying out the air lance from the reel, the air-motor driven reel is in a freewheeling mode and the air hose is subject to entanglement. Most importantly, it is essential that no lubricant be introduced into the air stream which could irreparably contaminate the catalyst and cause damage to the reactor itself. Air motors, without lubrication, experience excessive wear and resultant short service life. If the air motor is lubricated, lubricant may escape past seals and enter the air stream with catastrophic consequences.

The present invention is directed to overcoming the problems set forth above. It is desirable to have a device for unloading catalyst material from reactor tubes that has positive on/off motion control so that the nozzle end of an air lance can be precisely positioned within a reactor tube. It is also desirable to have such a device that has a constant speed so that the withdrawal of the air lance from the reactor tube can be accurately controlled. It is also desirable to have such a device wherein the reel on which the air lance hose is wound is retarded, or lightly braked, during the withdrawal of the hose from the reactor and entanglement of the hose due to freewheeling, is avoided. Moreover, it is extremely desirable to have such a device that is powered in such a manner as to avoid the introduction of lubricant into the air stream without adversely affecting the service life of the motor controlling the rotation of the hose reel.

SUMMARY OF THE INVENTION

In accordance with one aspect of the present invention, a catalyst and loading device for tubular reactors includes an air lance adapted for insertion into a tubular reactor and has a nozzle disposed at a distal end. The device also includes a reel for selectively storing, paying out, and rewinding the air lance, and a conduit providing fluid communication between a source of pressurized gaseous fluid and the air lance. The catalyst unloading device embodying the present invention also has an electric motor operatively connected to the reel.

Other features of the catalyst unloading device embodying the present invention include the device having an on/off valve disposed in the conduit, and the electric motor having a retarder for applying a braking force to the reel as the air lance is payed out from the reel. Still other features of the catalyst unloading device embodying the present invention include the device having a first switch for selectively controlling the operation of the motor, the valve disposed in the conduit being operated by an electrically operated solenoid controlled by a second switch, and a toggle switch for selectively controlling the retarder of the electric motor.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF A PRESENTLY PREFERRED EXEMPLARY EMBODIMENT

Figure 1:
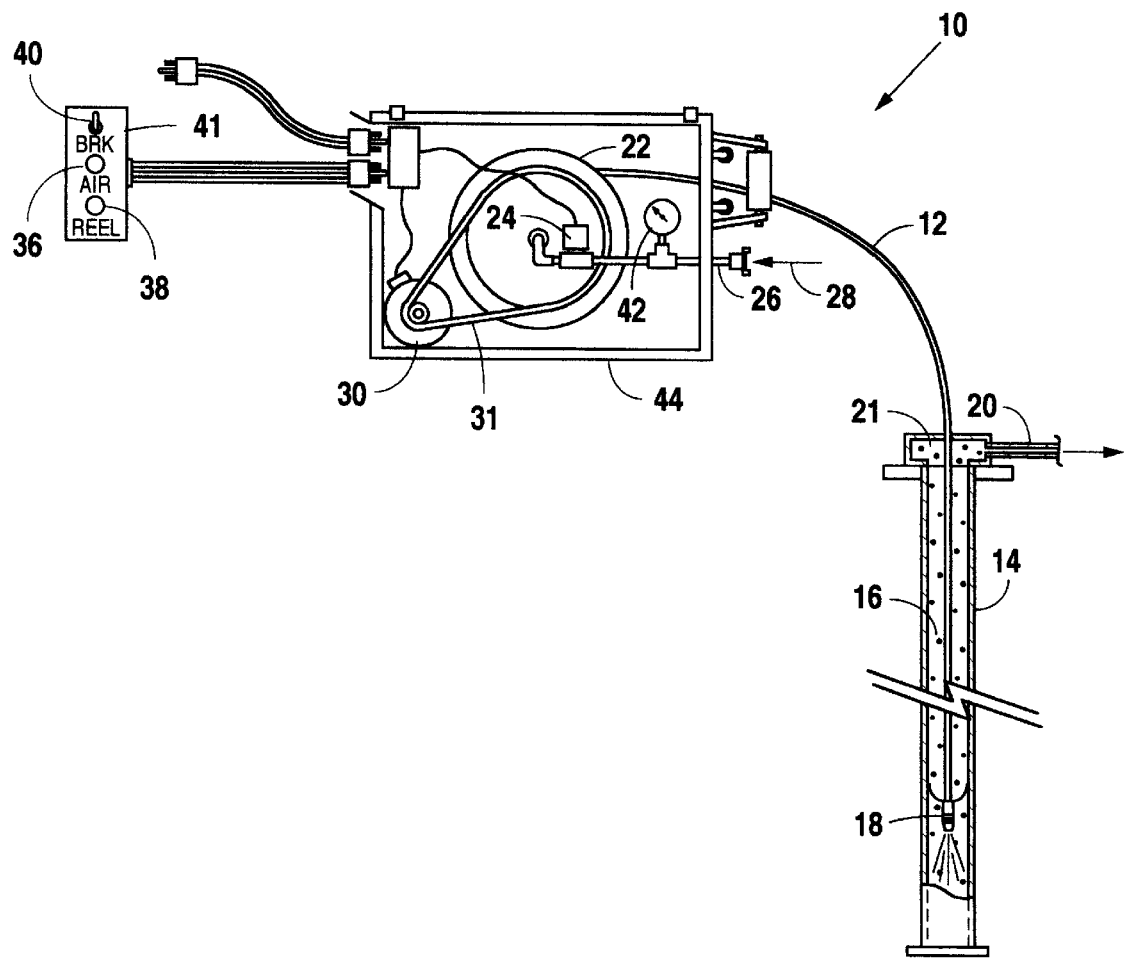
FIG. 1 is a schematic diagram of the catalyst unloading device embodying the present invention.

In the preferred embodiment of the present invention, a catalyst unloading device is generally indicated in FIG. 1 by the reference numeral 10. The catalyst unloading device 10 is specifically arranged to control the movement of a flexible, compressed-fluid, conduit, such as an air lance, 12 during insertion into a reactor tube 14, and subsequently upwardly withdraw the air lance 12 from the tube 14. The reactor tube 14 is filled with catalyst 16 that is no longer suitable for use in a reaction process, or for other reasons must be removed from the reactor tube 14. A nozzle 18 is disposed at a distal end of the flexible air lance 12. The preferred nozzle for use is that which is described in U.S. Pat. No. 5,222,533, which is incorporated herein for all purposes. More specifically, when air is used as the compressed fluid, and the air lance 12 is inserted into the reactor tube 14, compressed fluid is discharged through the nozzle 18 and produces a high pressure gas jet to dislodge and break up the catalyst, which is thereby fluidized and withdrawn from the reactor tube 14 through a vacuum line 20 attached to a plenum chamber 21 oriented about the reactor tube 14 through which the air lance 12 and nozzle 18 are inserted. A solenoid actuated on/off valve 24 is disposed in a pressurized fluid supply conduit 26 that provides fluid communication between a source of pressurized gaseous fluid, such as air as represented by arrow 28, usually connected to an air source at the plant or refinery, and the air lance 12.

The reel 22 is rotatably movable and the air lance 12 is selectively stored, payed out, and rewound about the reel 22 in response to rotation of the reel 22 by an electric motor 30 operatively connected to the reel 22, such as by a chain link or drive belt 31. Importantly, in the present invention, the motor 30 is an explosion-proof electric motor that, depending upon the electrical connections to the motor, has the ability to operate in either a forward or reverse direction. In addition, the electric motor 30 in the preferred embodiment of the present invention has internal windings which can be appropriately connected by external connections 32 which provide a DC counter-electromotive force to the motor 30 which produces a retarding, or braking, action on the reel 22 to prevent free-wheeling when the air lance 12 is payed out from the reel 22. In an exemplary embodiment, the motor 30 is a ½ hp, 650 rpm motor manufactured by the Imperial Electric Company, Akron, Ohio, and identified as model no. P56SX205.

Figure 2:
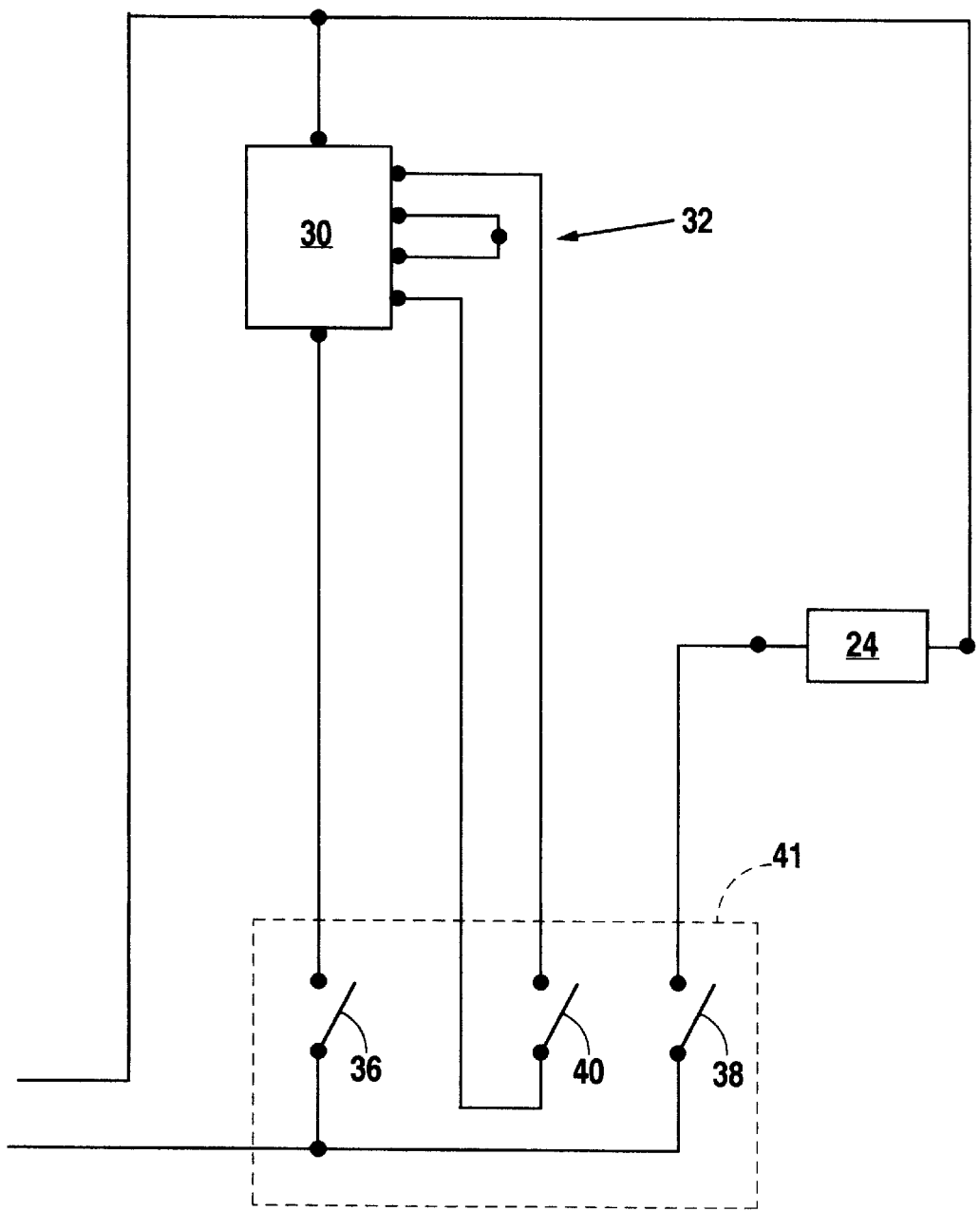
FIG. 2 is a schematic diagram of the electrical circuits of the catalyst unloading device embodying the present invention.

With additional reference to the schematic diagram of FIG. 2, the catalyst unloading device 10 includes a first switch 36 for selectively controlling the operation of the motor 30, a second switch 38 for selectively energizing the solenoid-actuated on/off valve 24 and moving the valve 24 between open and closed positions, and a toggle switch 40 for selectively controlling the retarder windings of the motor 30 thereby applying a braking force to the reel 22 as the air lance 12 is payed out from the reel 22. In the operation of the motor 30, the toggle switch 40 and the first switch 36 must both be closed to most safely activate the retract mode of the electric motor 30. The motor 30 may optionally be a direct current motor operating from a rheostat to control the speed of the reel 22 in which case toggle switch 40 would not be needed.

The first switch 36, the second switch 38, and the toggle switch 40, are desirably mounted in an enclosure 41 that provides a convenient foot control of the switches, leaving the operator's hands free to manipulate and guide the air lance 12. The connection to the switches in the enclosure 41 from the foot control can optionally be of sufficient length to place the device 10 outside of the reactor or be operated from within the reactor. The catalyst unloading device 10 embodying the present invention also desirably includes an air pressure gauge 42 that is positioned downstream of the electric solenoid valve 24 to indicate that proper working pressure is being delivered to the lance hose 12 during the cleaning operation. During cleaning, the pressurized fluid is typically maintained at a pressure of from 150 psi to 300 psi, depending upon the air supply 28 available. Also, the pressure gauge 42 provides a convenient check to personnel performing maintenance on the reel 22 or flexible lance 12 to insure that the electric solenoid valve 24 has been properly shut off when removing the tube from the reactor, or performing maintenance on the device 10. Desirably, the solenoid actuated on/off valve 24 is normally closed, and is only opened in response to the second switch 38 being closed.

The reel 22, motor 30, and other junction boxes and other components are desirably mounted within a stackable aluminum frame 44 which encloses the air lance reel 22, the electric motor 30, the solenoid valve 24, and control connections. The frame 44 is preferably enclosed on three sides and the top, thereby providing a protective enclosure which enhances safe operation of the catalyst unloading device 10 by providing personnel protection, minimizes pinch points in the reel 22 and the motor drive, weatherproofs the working components, and allows stacking of the catalyst unloading device 10 in a safe manner for minimum area storage requirements or transport to job sites. Usually when a removal job is performed a number of catalyst loading devices 10 will be used at the same time connected to a manifold (not shown) for operation.

Although the present invention is described in terms of a preferred exemplary embodiment, with illustrative key components and drive arrangements between the motor and reel, those skilled in the art will recognize that changes in those components and specific component arrangements may be made without departing from the spirit of the invention. Such changes are intended to fall within the scope of the following claims. Other aspects, features, and advantages of the present invention may be obtained from a study of this disclosure and the drawings, along with the appended claims.

ELEMENT LIST

10 Catalyst unloading device
12 air lance
14 reactor tube
16 catalyst
18 nozzle
20 vacuum line
22 reel
24 solenoid actuated on/off valve
26 conduit
28 source of pressurized fluid
30 motor
31 drive belt
32 external wiring connections
34 retarder
36 first switch (motor)
38 second switch (air)
40 toggle switch (retractor)
41 enclosure (foot control) for switches
42 pressure gauge
44 frame

What I claim is:

1. A catalyst unloading device for tubular reactors comprising:

an air lance having a nozzle disposed at a distal end thereof and adapted for insertion into a tubular reactor;

a reel for selectively storing, paving out and rewinding said air lance;

a conduit providing fluid communication between a source of pressurized gaseous fluid and said air lance;

an electric motor operatively connected to said reel;

a first switch for selectively controlling the operation of said motor, a valve disposed in said conduit that is selectively movable between open and closed positions by an electrically operated solenoid controlled by a second switch, and said electric motor includes a retarder for applying a braking force to said reel as said air lance is payed out from said reel, said retarder being selectively controlled by a toggle switch.

2. A catalyst unloading device, as set forth in claim 1, wherein said device includes a foot-operable control box, and said first switch, said second switch, and said toggle switch are mounted in said control box.

* * * * *